United States Patent [19]

Shore et al.

[11] Patent Number: 4,598,810
[45] Date of Patent: Jul. 8, 1986

[54] APPARATUS AND METHOD FOR VENDING AND ACCEPTING RETURN OF RE-USABLE ARTICLES

[75] Inventors: Barry Shore, Northbrook; Michael Schwarzberger, Chicago, both of Ill.

[73] Assignee: ABM Industries, Inc., Skokie, Ill.

[21] Appl. No.: 601,277

[22] Filed: Apr. 17, 1984

[51] Int. Cl.$^4$ .......................... G07F 7/10; G07F 11/02
[52] U.S. Cl. ......................................... 194/205; 221/5; 221/66; 221/88; 235/381; 364/749
[58] Field of Search .................... 186/55, 56; 194/4 C, 194/10, DIG. 6, 15; 221/5, 88, 66; 235/379, 380, 381; 369/178, 192; 414/273; 364/479

[56] References Cited

U.S. PATENT DOCUMENTS

| | | | |
|---|---|---|---|
| 2,760,780 | 8/1956 | Kenney | 369/192 |
| 2,777,603 | 1/1957 | Baum | 221/5 X |
| 3,254,749 | 6/1966 | Scherer | 194/13 X |
| 3,802,581 | 4/1974 | Frederick | 414/273 |
| 4,219,296 | 8/1980 | Fujii et al. | 414/273 |
| 4,300,040 | 11/1981 | Gould et al. | 235/380 X |
| 4,458,802 | 7/1984 | MacIver et al. | 221/81 X |

FOREIGN PATENT DOCUMENTS 54-66806  5/1979  Japan ........................ 221/79

*Primary Examiner*—Charles A. Marmor
*Attorney, Agent, or Firm*—Paul H. Gallagher

[57] ABSTRACT

A vending unit includes a plurality of cubicles each holding a TV film, dispensed in response to the manipulation by an identified patron. The patron has an identification code number, which upon being entered as information into the vending unit, energizes a computer unit and conditions the apparatus for vending. This information may be entered by pushbuttons or using an ID card. A monetary coin or money bill, or token, is inserted and then a film is dispensed in response to depression of a selection button by the patron. The apparatus includes a record of transactions by each patron, according to his ID code number, which shows films taken out, and their return, and a security deposit credit, and sets off the dispensed films against that deposit credit, and re-establishes the deposit credit upon return of the film. Upon entering the ID information, instructions are given to the patron by the computer, visually or audibly, for successive steps to be taken following each previous step. An alternative arrangement utilizes a billing operation instead of a coin or token. The invention also encompasses an arrangement including a central station and a plurality of substations. Another alternative includes an ID card, known as a "smart card," that includes a complete built-in computer that performs all the functions of the computer unit in the first forms.

27 Claims, 42 Drawing Figures

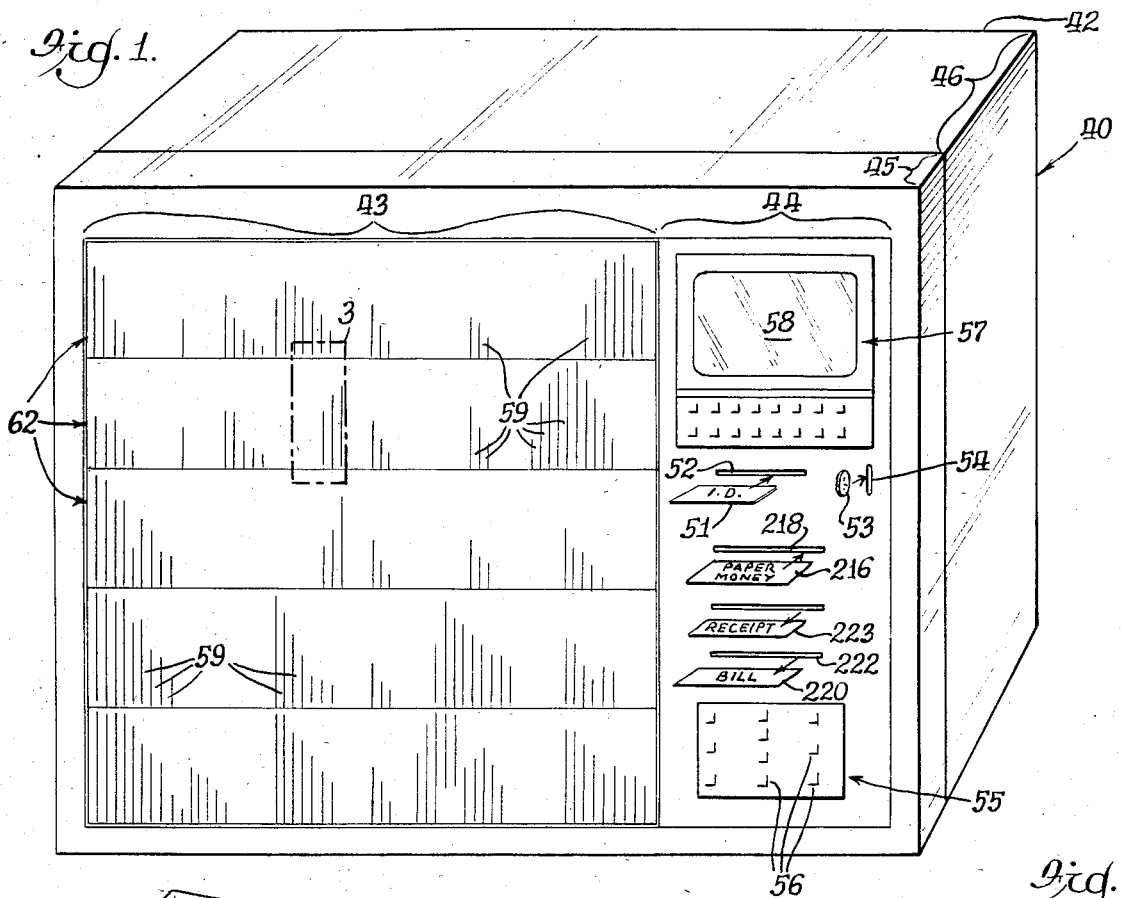
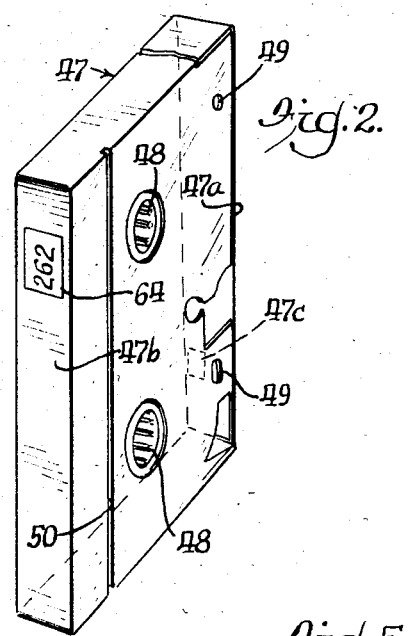
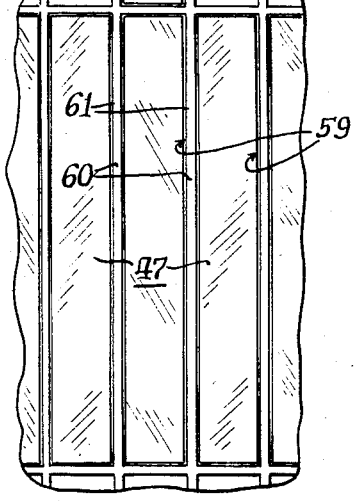
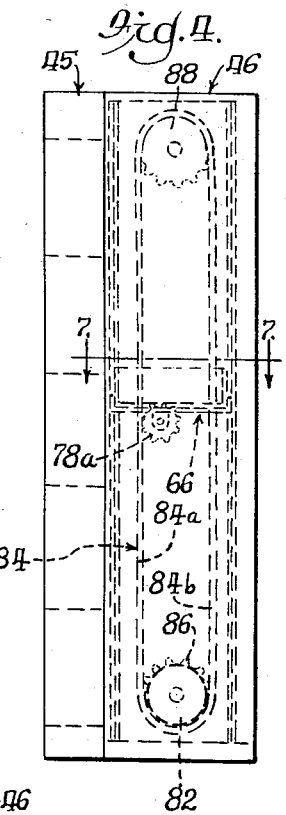
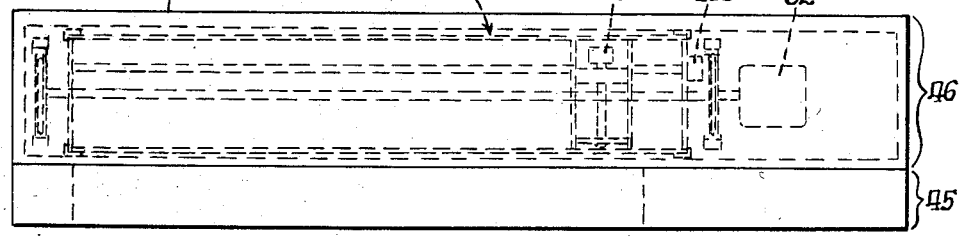

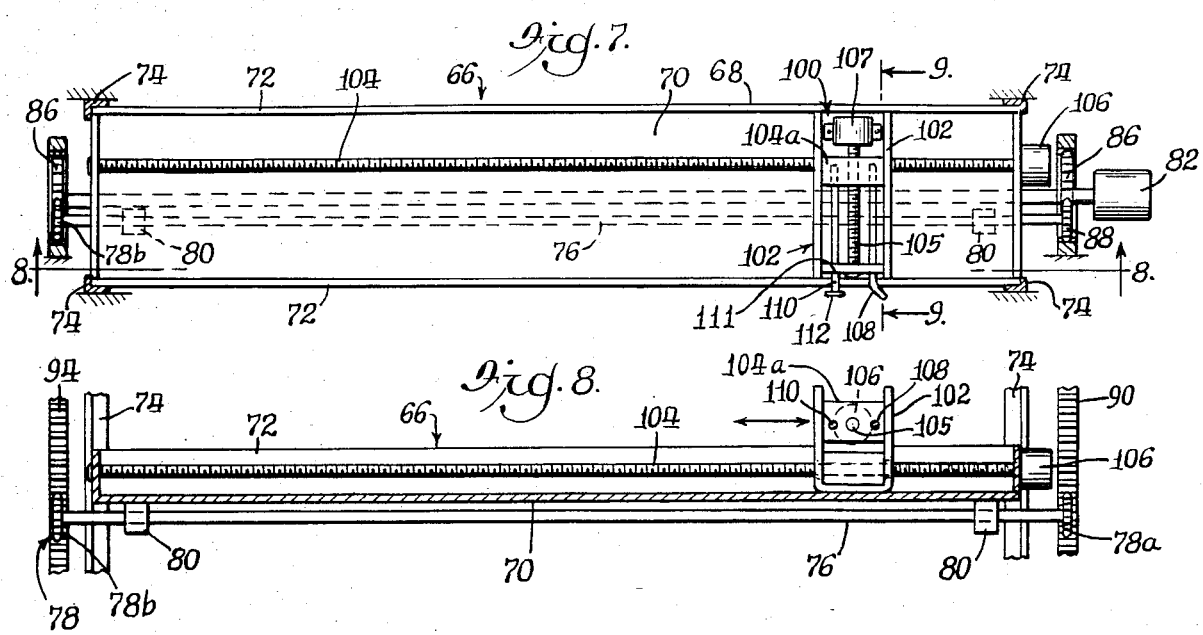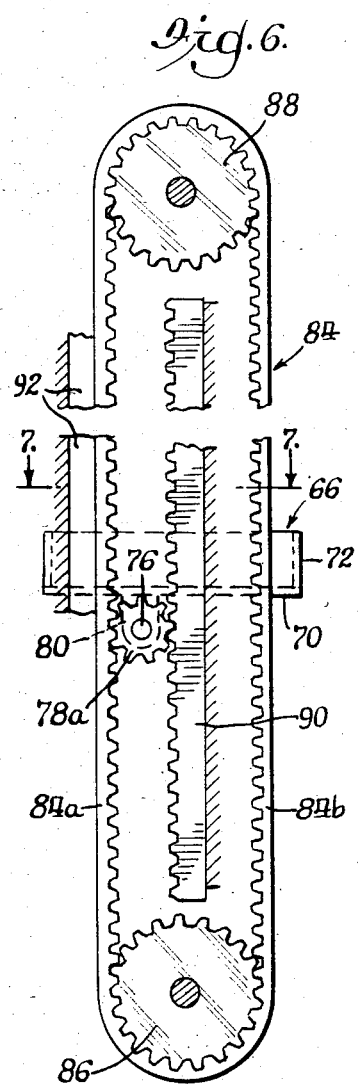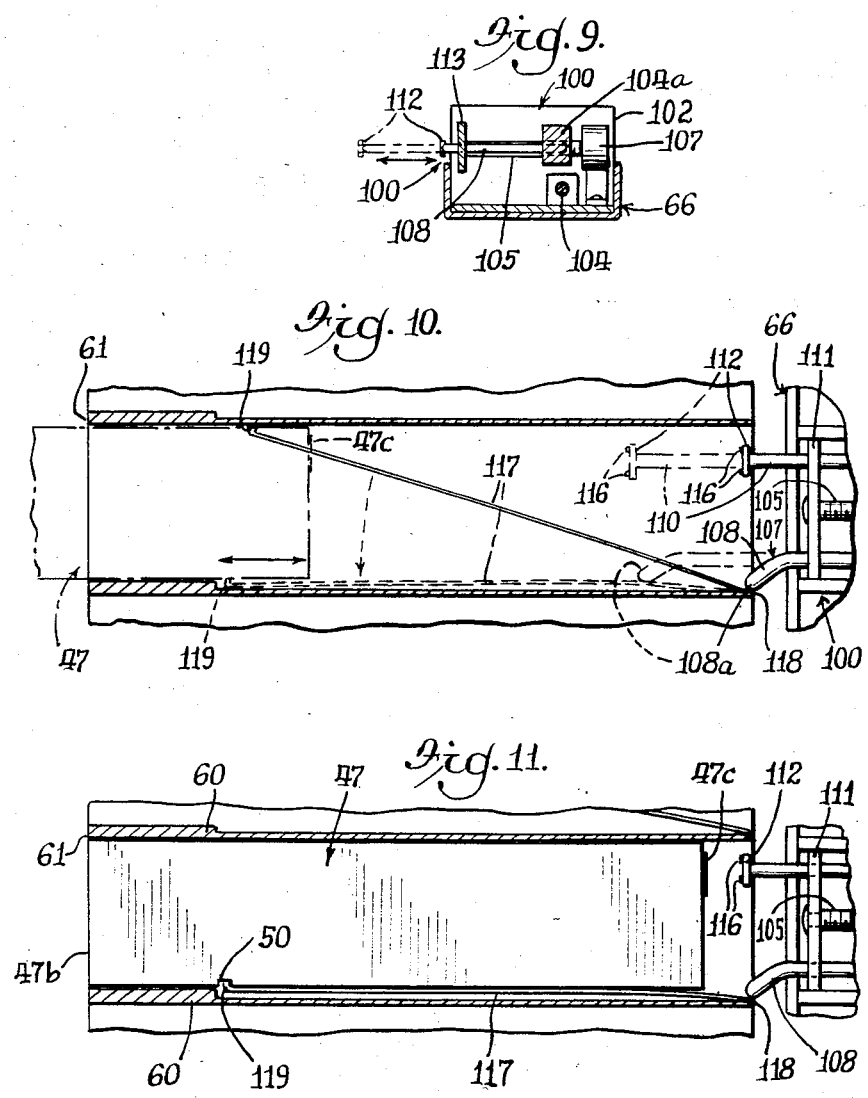

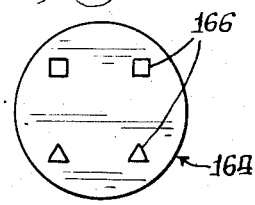
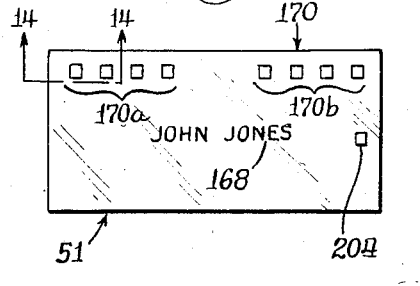
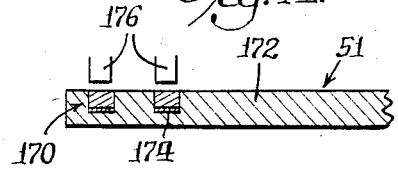
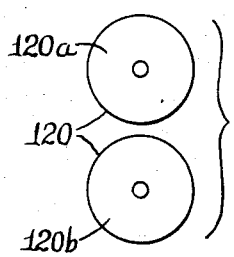
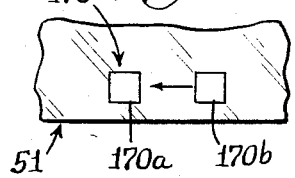
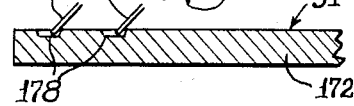
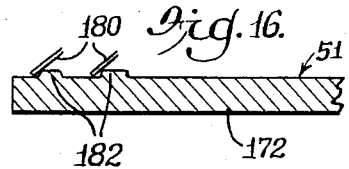
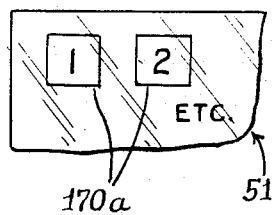
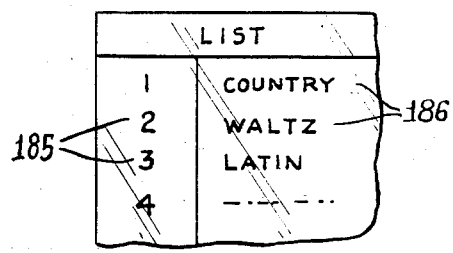

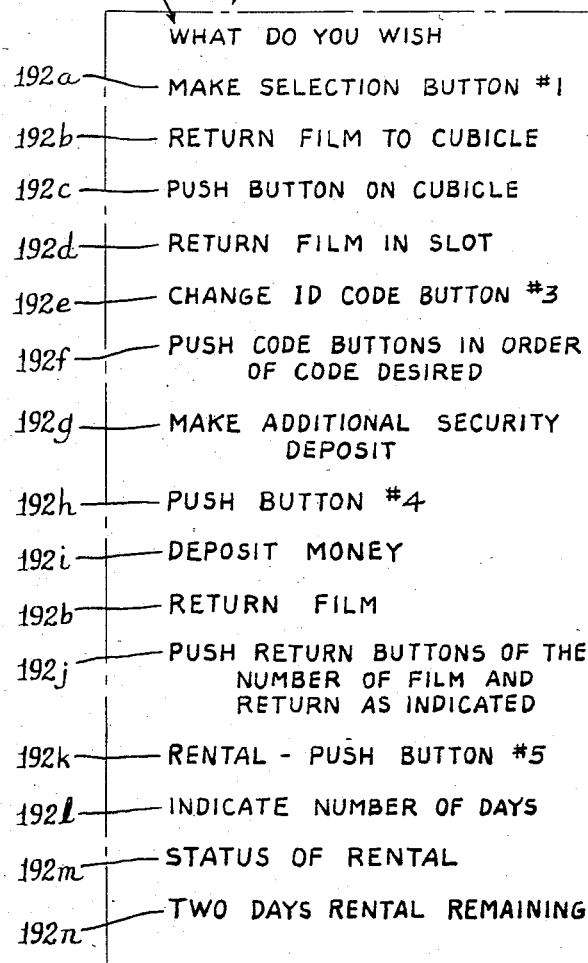
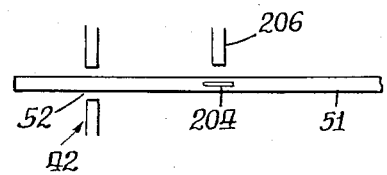
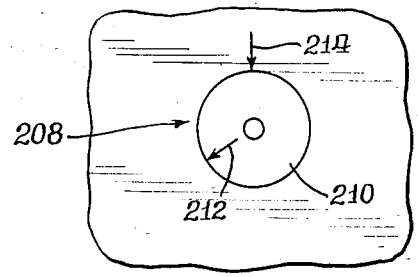
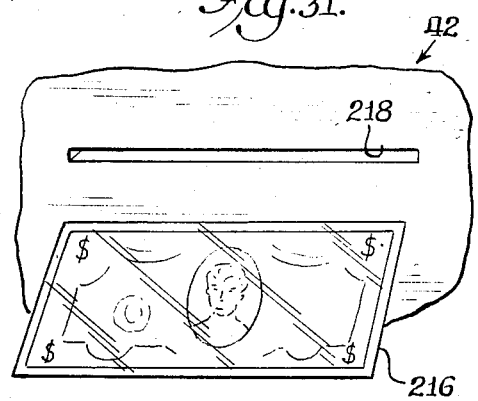
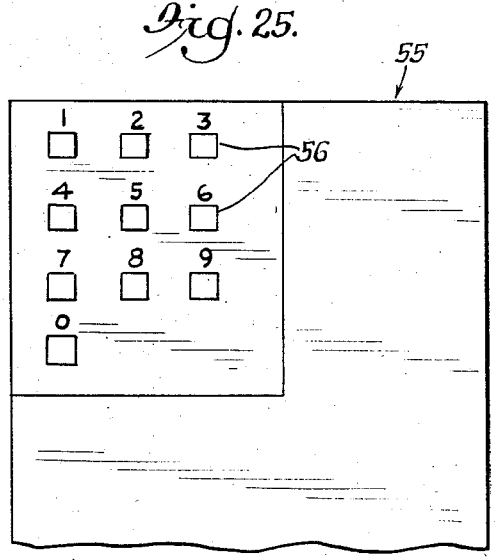
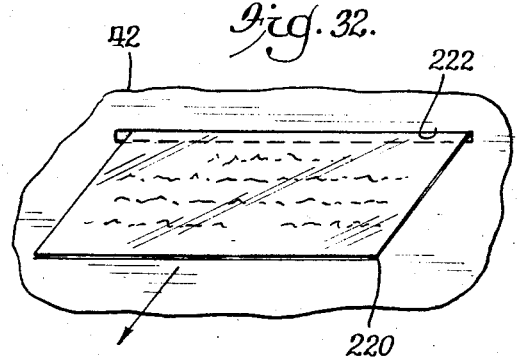

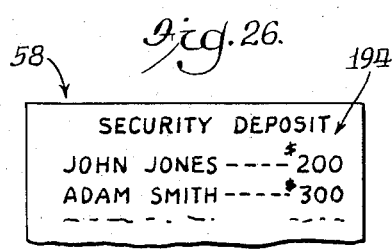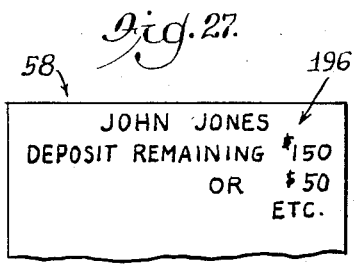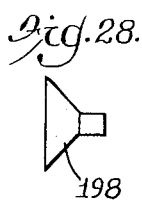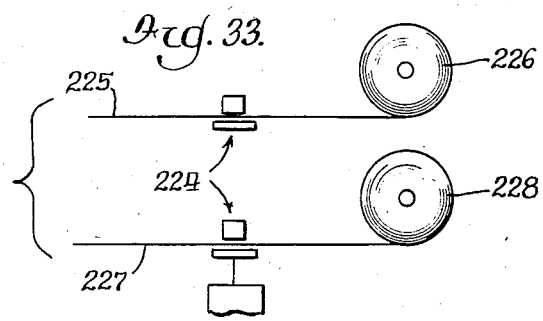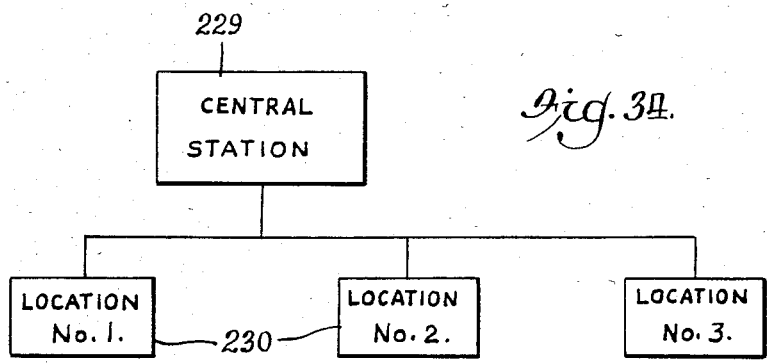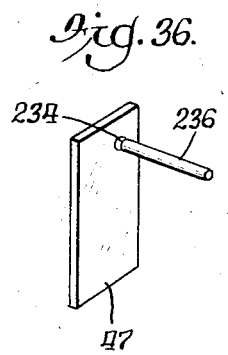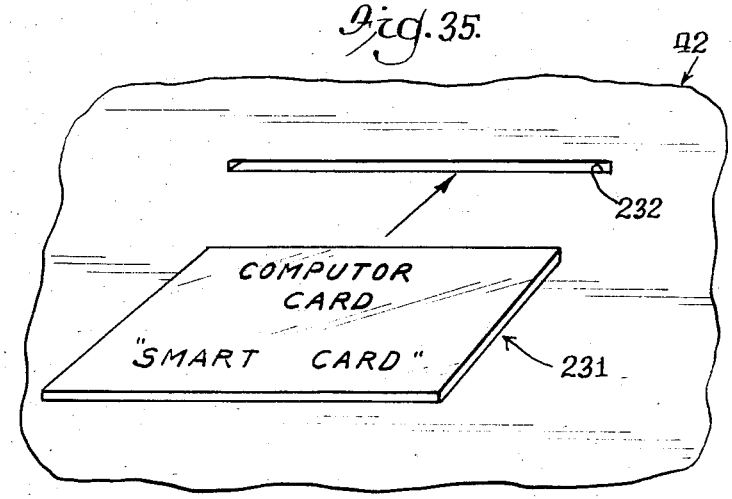

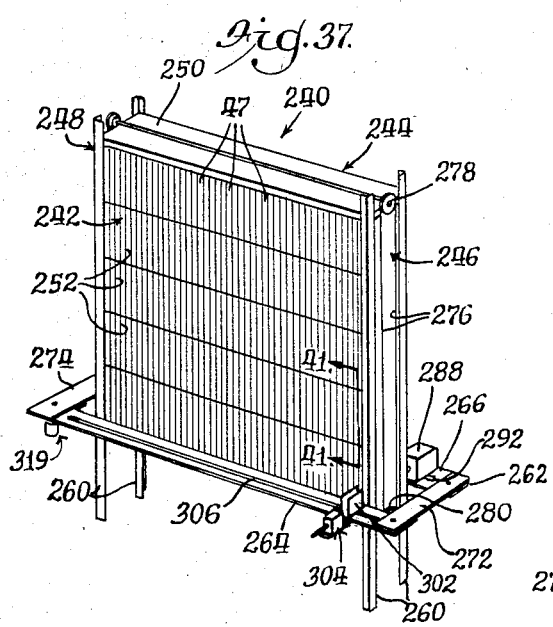
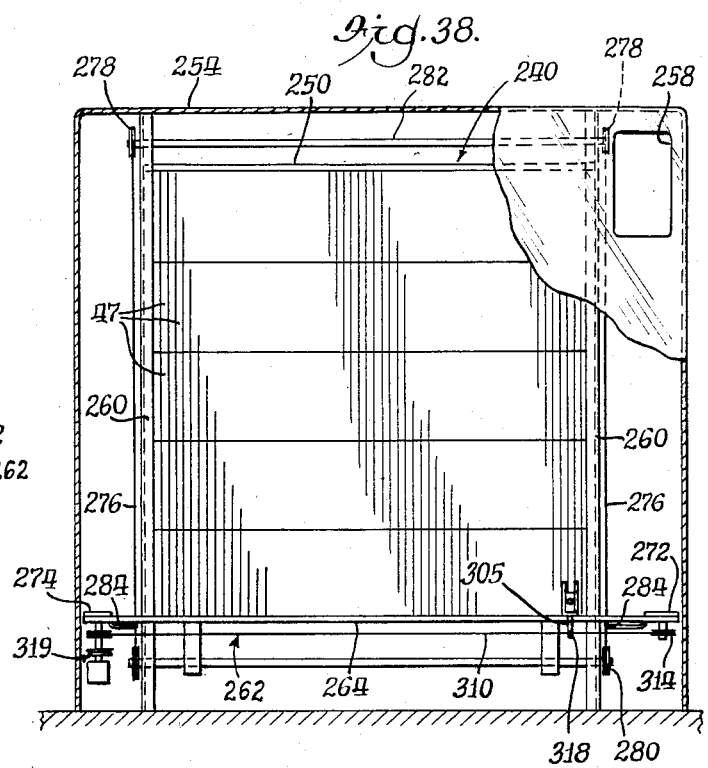
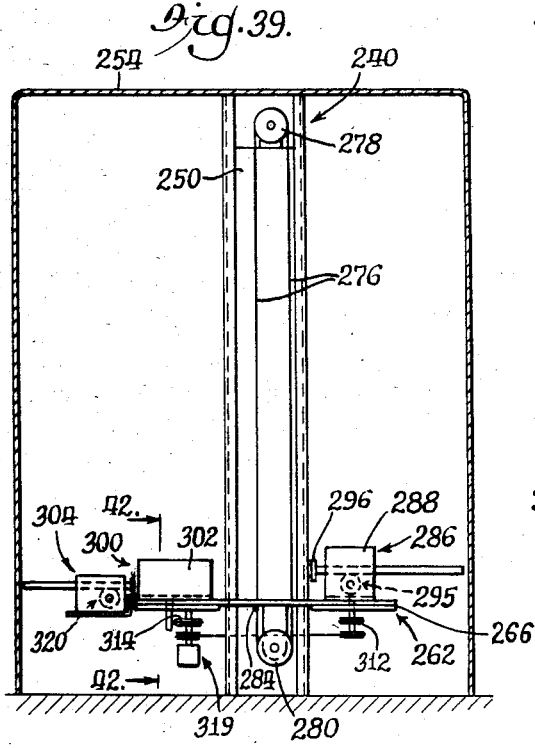
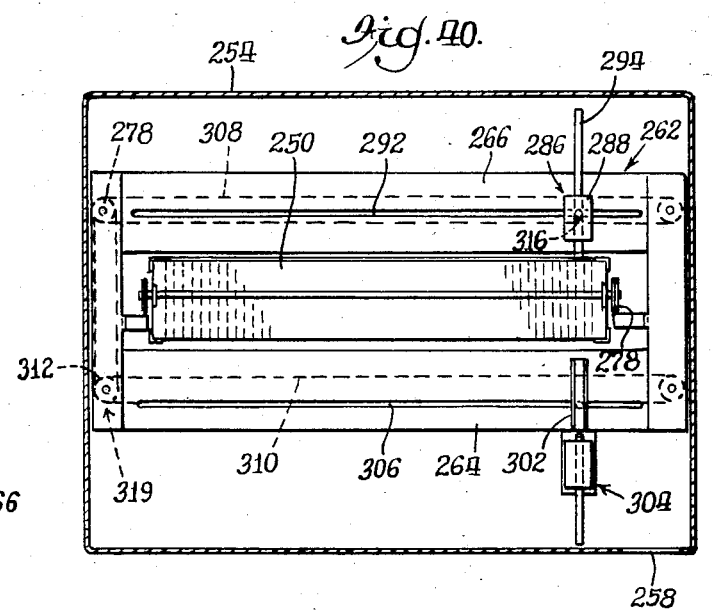
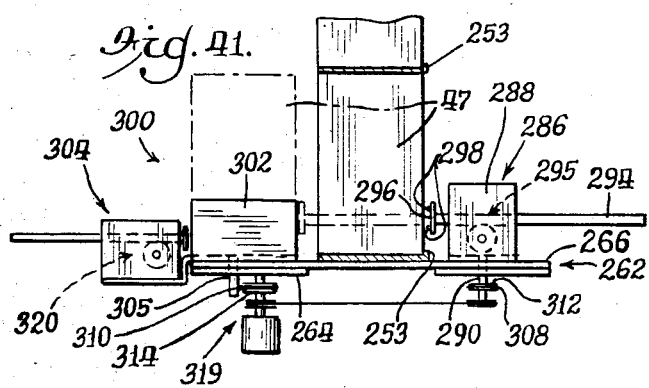
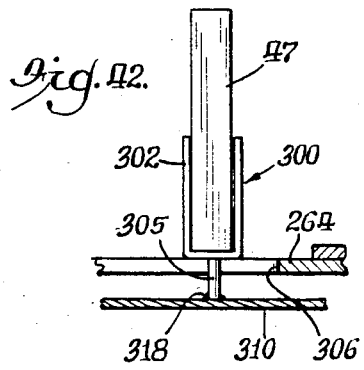

APPARATUS AND METHOD FOR VENDING AND ACCEPTING RETURN OF RE-USABLE ARTICLES

OBJECTS OF THE INVENTION

A broad object of the invention is to provide vending apparatus, and method related thereto, having the following features and advantages:

1. It incorporates the broad concept of vending a re-usable article to a patron, and accepting the return of the article by the patron for re-use.
2. It is controlled by the patron, who is assigned an identification code number, and who actuates the apparatus by the use of that code number, which may be done by manipulation of selection buttons representing the number, or by the use of an identification card, or ID card, carried by the patron and bearing the number.
3. It maintains a record for each identified patron, vends or issues an article to such patron, records such step of vending and continued absence of the article, and records its return.
4. It enables the patron to alter his own identification code number, within a limited scope, within the overall control of the code indicia by the owner of the apparatus.
5. It performs its intended functions without the necessity of an attendant.
6. It can be actuated by the patron according to selective predesign, by money currency or by predetermined tokens.
7. It includes provision not only for control by money currency or tokens, but alternatively functions on a credit operation, producing billing to the patrons for the articles vended.
8. It includes a program of operation facilitating the control manipulations by the patron, wherein, in response to entrance of his code number indicia, it presents instructions, visually or audibly, to the patron for him to indicate the character of the action he desires to take, and then indicates the precise steps to take to accomplish that action.
9. It is adapted to an arrangement that includes a central station and a plurality of local installations controlled by the central station.

DESCRIPTION OF CERTAIN PREFERRED EMBODIMENTS

In the drawings,

FIG. 1 is a perspective view of an apparatus embodying the features of the present invention;

FIG. 2 is a perspective view of an article to be vended, in this case a TV film or video tape;

FIG. 3 is a large scale face view of a portion of the front surface of the apparatus of FIG. 1, contained in the dot-dash line rectangle 3;

FIG. 4 is an end view taken from the right of FIG. 1;

FIG. 5 is a top view of the apparatus of FIG. 1;

FIG. 6 is a view of an internal component of the apparatus of FIG. 1, oriented according to FIG. 4;

FIG. 7 is a horizontal view of an element of the device of FIG. 6, and oriented according to line 7—7 of FIGS. 6 and 4;

FIG. 8 is a side view taken at line 8—8 of FIG. 7;

FIG. 9 is a view taken at line 9—9 of FIG. 7;

FIG. 10 is a top view of an empty cubicle;

FIG. 11 is a top view of a cubicle with the article to be vended therein;

FIG. 12 is a face view of a token used in the vending unit;

FIG. 13 is a face view of the ID card used;

FIG. 14 is a sectional view taken at line 14—14 of FIG. 13;

FIG. 15 is a view similar to FIG. 14 showing an alternative construction of card;

FIG. 16 is a view similar to FIGS. 14 and 15 showing another alternative form of card;

FIG. 17 is a detail diagrammatic view of certain elements in an ID card;

FIG. 18 is a diagrammatic view of the memory/record component of the computer unit;

FIG. 19 is a fragmentary view of certain details of an ID card;

FIG. 20 shows a list of the articles to be vended, by individual identification;

FIG. 21 is a diagrammatic representation of items of information recorded in the record of the computer unit;

FIG. 22 is similar to FIG. 21 but representing other items;

FIG. 23 is a diagrammatic view of the screen of the computer unit bearing certain messages;

FIG. 24 is similar to FIG. 23 but having other message and instructions;

FIG. 25 is a face view of one of the elements of the control unit of FIG. 1;

FIG. 26 is similar to FIG. 23 showing still other messages and instructions;

FIG. 27 is similar to FIG. 23 showing other messages;

FIG. 28 shows a speaker, constituting an audible means for messages and instructions;

FIG. 29 is a diagrammatic illustration of the ID card, and indicating a step in controlling the control unit;

FIG. 30 is a diagrammatic representation of clockwork utilized in the vending operation;

FIG. 31 is a diagrammatic illustration of the use of paper money in the apparatus;

FIG. 32 is a diagrammatic illustration of the issuance of a bill to the patron, rather than the acceptance of value pieces;

FIG. 33 shows a printer;

FIG. 34 is a diagrammatic illustration of an arrangement utilizing a central station and a plurality of substations;

FIG. 35 is a diagrammatic illustration of the use of a self-contained card computer with the apparatus;

FIG. 36 is a perspective view of an article to be vended, and a sensing means for sensing the article;

FIG. 37 is a perspective view of a vending unit of a modified form of the invention;

FIG. 38 is a front view of the unit of FIG. 37 with an enclosure or casing thereover;

FIG. 39 is an end view of the unit;

FIG. 40 is a top view of the unit;

FIG. 41 is a sectional view taken at line 41—41 of FIG. 37 but showing active movable vending components, included in the view; and FIG. 42 is a view taken at line 42—42 of FIG. 39.

The drawings for the most part are diagrammatic in nature, principally for the sake of simplicity and convenience. The invention consists in a broad concept, and the details of the apparatus embodying the concept, and for carrying out the method, may be any of a great number and a wide variety. The concept is (a) vending re-usable articles to a patron, (b) making a record thereof, and (c) accepting the return of the articles by the patron, for re-use. The apparatus basically incorporates and utilizes electronic components, but such electronic components are necessarily supported by electrical and mechanical features, and the apparatus incorporates all of those three features in various combinations and relationships. For convenience herein, the apparatus may be referred to as having physical or mechanical features distinguishing from the method or process, and such features may be referred to generically as physical. For example, magnetic elements are incorporated in electronic components. Since the invention has to do with the broad concept, it is not to be limited to specific physical details utilized for carrying out the concept, except as necessary, according to the context herein.

The re-usable article, referred to above, is represented herein by a film or video tape, but the invention is applicable to articles of any of a wide variety, such as tools, for example and other articles. The articles are vended or dispensed to a patron, to be returned by the patron to the apparatus for re-use. The operation necessarily involves the utilization of an article to be vended that is of greater value than the cost of vending, thereby involving the return of the article, and this in turn necessarily involves maintaining a record of the patron, whereby if the patron fails to return the article that was vended, a record of that fact is maintained. A further feature is that the article is not only re-usable, but the same identifiable article is to be returned. Additionally, the foregoing requires the patron to be identified, which is done by assigning him an identification code number. This code number is utilized preferably by entering the number into the apparatus by the patron by actuation of selecting pushbuttons, but it may be, if desired, embodied in an identification card (ID card) used by the patron, as described below.

Referring in detail to the drawings, attention is directed to one form of the apparatus, shown in FIGS. 1-11. FIG. 1 shows an entire apparatus, 40, embodying the features of the invention, and constituting one form thereof. It includes a cabinet 42 of any suitable character, having two main compartments 43, 44 facing the front, and together forming a front portion, indicated at 45, and a rear compartment 46 in which are disposed certain operating and moving parts for use in the vending steps.

As indicated above, this present apparatus is utilized for vending films or video tapes, one of which is shown at 47 in FIG. 2, having an inner edge surface 47a and an outer edge surface 47b. The inner edge surface is provided with a metallic leaf 47c serving as an electrical contactor as referred to below. This film is of known kind and of standard construction, but it is pointed out that it includes certain constructional features utilized in the present apparatus,—it has a pair of holes 48 in the film reels, and other holes 49 in the film casing as well as a groove 50, any of which may be used in the present apparatus for looking the film in place in the cabinet.

The cabinet 42 includes a panel 55 having a plurality of pushbuttons 56, or other selecting elements, for entering the information by the patron, as mentioned above. Also as mentioned above, an ID card may be used instead, and in FIG. 1 such an ID card is shown at 51, in position for insertion into a slot 52, while a token 53 is shown in position for insertion into a corresponding slot 54. The pushbuttons 56 are also utilized for selecting the desired articles, and other functions. The following description covers the steps in the vending operation after the identification indicia of the patron is entered, and these same steps are followed whether that information is entered by means of the pushbuttons or the ID card.

The main compartment or space 43 is utilized for holding the films 47, while the smaller compartment 44 contains other components, such as a computer unit 57 and other elements. It will be understood that the specific design of the cabinet may take any of various forms, such, for example, as that the computer unit may be located on the top, etc. The computer unit includes a screen 58 exposed to the exterior, for observation by the patron, while other components thereof may be enclosed in the cabinet.

The character of the computer unit will be referred to hereinbelow, in connection with the specific steps taken in the vending operation.

The large compartment 43 is provided with a plurality of cubicles or cells or recesses 59 in which the films 47 are placed, defined by walls 60. These cubicles 59 are open to the exterior at the front and are so dimensioned that when the films are in place therein the outer edge surfaces 47b of the films are preferably closely adjacent the plane of the front surfaces of the cubicles, at 61 (FIG. 11), The cabinet can, of course, be made of any size desired, but a practical example is that the portion 43 is divided into five horizontal rows 62 and each row includes sixty cubicles 59, making a total capacity of three hundred films.

The outer edge surface 47b bears the identification of the films as indicated at 64 including, for example, a numeral see (#262 in FIG. 2), and the title.

The specific steps of vending the articles, or films, are controlled by the computer unit 57 as described hereinbelow, but attention is directed to FIGS. 4-10, which show a mechanical means, including drive means, for performing vending operations, and specifically releasing particular films, identified and selected by the patron. This mechanism is included in the rear compartment 46, and according to the characterization of the apparatus by broad concepts, various details are omitted.

This mechanism for performing the releasing steps, is indicated in its entirety at 66 and includes a horizontal transverse bar 68 which for convenience may include a floor element 70 and a rear side flange 72. It is mounted for moving vertically throughout the range of the rows 62 (FIG. 1) and in such movements is guided by vertical fixed guide means 74 (FIGS. 7 and 8). This bar is mounted on a shaft 76 extending longitudinally thereof, and having gears 78, individually identified 78 and 78b thereon beyond the ends of the bar. Suitable bearings 80 mount the bar on the shaft.

The shaft 76 is rotated, for moving the bar vertically, by an electric motor 82 mounted in fixed position in the cabinet, through a toothed belt 84, having runs 84a and 84b (FIGS. 4 and 6), trained on a gear 86 on the motor shaft, and another gear 88 mounted in the cabinet adjacent the top thereof. A vertical rack 90 is mounted in the cabinet and the gear 78a meshes with that rack. A backing element 92 retains the up run 84a in mesh with the gear, while the down run 84b may run free. At the opposite end of the bar, the gear 78b engages a vertical rack 94 mounted in the cabinet.

The bar 68 is moved vertically in response to actuation of the motor 82 and corresponding rotation of the shaft 76, to various positions, corresponding to the rows 62.

The component of FIGS. 4-9 also includes a unit 100 movable along the bar 68 for registering with selected ones of the films, having a block or base 102 mounted on the bar and moved by a threaded shaft 104 driven by a motor 106 carried by the bar.

The unit 100 has actuating means 107 for releasing the selected film and otherwise controlling it, which is actuated as described hereinbelow. In summary, in the selecting steps, the motor 82 drives the bar 68 vertically to the particular row 62 (FIG. 1) where the selected film is located, and the unit 100 is moved along the bar, either simultaneously or sequentially, relative to the movement of the bar, to position the unit 100 in register with the selected film.

Referring to FIGS. 7-9, the base 102 is in the form of a channel extending transversely of the bar, and slidably mounted therein is a block 104a. This block is driven by a threaded rod 105 in turn driven by a motor 107 carried by the base. Mounted on and carried by the block 104a is a releasing rod 108 and an ejecting rod 110, both extending forwardly, being suitably supported and guided by an element 111. The releasing rod 108 has a plain end 108a, while the ejecting rod 110 has a block 112 on its outer end in which are mounted a pair of contacts 116 in an electrical control circuit. In the vending step, these contacts engage the contactor 47c on the film case, and the ejecting rod 110 also acts as a pusher in the vending step. The specific steps in the operation of this component will be referred to hereinbelow.

FIGS. 10 and 11 show a selected film and the cubicle in which it is located. A leaf spring element 117 is firmly secured to the side wall of the cubicle, as by welding, at 118. It extends essentially longitudinally of the cubicle, horizontally, and at its outer or front end it has a projection 119, which may be a bent over portion of the leaf spring. It is self biased to a diagonal position as in FIG. 10, and assumes that position when the cubicle is empty, and blocks the insertion of a film into the cubicle.

In the steps of returning a film, and inserting it into the cubicle (as well as in vending as described below), the unit 100 is positioned in register with the cubicle, and the block 104a therein removed forward, as represented in FIG. 11. As the block 104a is moved forward, it moves the releasing rod 108 and ejecting rod 110 into the cubicle, the releasing rod engaging the leaf spring element 117 and moving it to the position of FIG. 11, and the patron inserts the film into the cubicle. When it reaches its innermost position, the contactor 47c. engages the contacts 116, completing a circuit through them effecting a control function which causes the rods 108, 110 to withdraw. This leaves the leaf spring element 117 free to move toward the film, and the projection 119 enters into the groove 50 in the film case, and locks the film in the cubicle. The unit 100 is then free to be moved to another location.

In the vending operation, the steps are essentially the reverse of those in returning the film. In the vending operation, the control signals are initiated through the computer unit 57, and in response to such control signals, the rods 108, 110 are projected or moved forward, and in this movement, the releasing rod 108 engages the leaf spring element 117, and springs it back against the side wall of the cubicle, and withdraws the locking projection 119 out of the groove 50 in the film case. In the same step, the ejecting rod 110 engages the film and pushes it outwardly (FIG. 11) to a position where it can be grasped and withdrawn, and at the same time the contacts 116 engage the contactor strip 47c on the film, which produces an operating function, including withdrawing the rods 108, 110, and conditions the unit 100 for movement to another location.

The computer unit 57 may be any of various kinds, but we have found to be very succeessful, a computer put out by Apple, known as Model IIe, which incorporates components and elements capable of carrying out all of the functions utilized in the present apparatus, referred to hereinbelow. As a general statement of its operation and function, the owner, or prime operator of the apparatus enters information into the computer unit, according to the desired operation, and the computer unit then controls the operation and function of the entire apparatus thereafter, in response to the activation thereof by a patron.

The entire apparatus is of such nature that it does not need immediate human attention, that expression as used herein meaning that the apparatus functions entirely in response to the activitation by a patron, without the attention of the owner or a supervisor, except for normal periodic supervision and inspection.

The apparatus includes control elements interposed between the computer unit and the vending component or unit, and includes such features and facilities as selection buttons, means for reception of coins or tokens, or paper money, and reception of the ID card.

In the description of the apparatus, reference is made to a record, in which is entered all of the necessary information and instructions, and which includes the status of each patron's own account according to his activities. Such a record is constituted by the memory of the computer unit. The record includes a memory, a magnetic disk, and a bubble memory, the latter serving as a permanent memory, for use if all else should be destroyed. The permanent memory may instead, if desired, be formed by a second disk, as indicated in FIG. 18, showing a pair of disks 120, a first disk 120a which constitutes a current record, and second disk 120b, onto which the material on the first disk is transferred periodically, such as daily. The memory component functions not only as a record in the present case, but performs the functions desired, that is, accepting information, reproducing information, effecting controls, etc.

The apparatus is preferably operated by money, but it is within the scope of the invention to utilize tokens. FIG. 12 shows such a token 164, which, when utilized, is provided with certain physical elements 166 which enable its use only with the present apparatus, the apparatus having corresponding physical features cooperating therewith. In the operation of the apparatus with tokens, each token is given a monetary value, and they are obtained by the patron from the proprietor, for example, of the location of the installation, or from the owner of the apparatus, etc.

The ID card 51 is shown in detail in FIGS. 13-16. The card is made of any suitable material, and may have the name of the patron to whom it is issued, as indicated at 168, and is provided with a plurality of identifying code elements 170 sensed by sensor elements in the apparatus, as referred to again hereinbelow. The arrangement provides for the identification of the patron according to the system of the owner, and with the further feature that each patron can provide further identification for himself. For this purpose the code elements 170 are arranged in two groups, 170a and 170b. In issuing the card, the owner provides an identification by activating selected ones of the elements 170a and that same information is entered into the record of the individual patron, so that when the card is inserted by the patron, that patron's own record is identified and all transactions are entered in that record.

For establishing the additional identification for each patron, as the ID card is issued to the patron, the code elements 170b are left blank, but the apparatus includes means for the patron himself to activate any of those code elements to provide an additional identification code as further assurance against anyone else's use of his card if the card is lost. Also, the patron may wish to change his own additional identification on occasion, to provide further assurance against use by an unauthorized holder.

There is provision in the computer unit 57 whereby to render the code set up in the elements 170a be themselves inoperative, where an additional identification code is set up in the elements 170b. This arrangement is indicated in FIG. 17 where when one element 170b is activated, it deactivates the elements 170a. It will be understood that this representation is merely diagrammatic, since the step is entered into the record or memory of the computer unit.

This feature, namely, that the patron can provide further identification for himself, is also incorporated in the arrangement where the identification information is entered by pushbuttons, as well as by the use of an ID card.

Reference is made to FIGS. 14–16 for details of construction of the ID card. The card has a body 172 and in one case, in FIG. 14, the elements 170 may assume the form of magnetic elements 174 embedded therein, which are sensed by sensor magnetic or electronic elements 176 in the computer unit.

It is also possible to use other forms of elements 170 such as in FIG. 15 where the elements are in the form of depressions 178 into which mechanical sensor elements 180 enter, these sensor elements performing a control function by their physical movement into the depressions.

FIG. 16 shows an arrangement utilizing raised elements or embossments 182 instead of depressions, engaged by the sensor elements 180, these sensor elements in this case also performing the desired function according to their physical movements caused by the raised elements.

FIG. 19 shows a fragment of an ID card 51 which shows the code elements 170; the elements 170a at the left are used by the owner to provide an identification code for the patron. These may be numerals, or of course other suitable characters.

The machine is preferably provided, at a suitable location, with a list 184 as shown in FIG. 20, which includes the individual identifications of all of the films, such as by number as indicated at 185 and by title as indicated at 186. The patron thus locates the number of the film he desires, known to him by the title.

FIG. 21 is a diagrammatic representation of a memory in the computer unit. As noted above, the memory may consist of a disk, and the information desired is recorded thereon at suitable locations. The representation of FIG. 21 includes for example a column 188 identifying the films by number, and other columns 189 which constitute a record of the code numbers of the patrons, as provided on the ID cards, according to the activities of the patrons.

FIG. 22 diagrammatically shows another representation 190 which is a record of the patrons, having their identification numbers as indicated at 191, and a record of the films withdrawn as indicated at 192. The items incorporated in the record may be as desired, and may be any of a wide variety of information.

FIG. 23 diagrammatically represents the screen 58 of the computer unit with messages displayed thereon, indicated at 193, which are displayed pursuant to the insertion of the ID card by the patron. These messages are directed to the broad steps in the operation, such as rent, withdraw films, return films, pay a bill, alter the code, etc. These messages are accompanied by numbers, and the patron then, pursuant to his desired step, such as to rent a film, actuates button #1, which is one of the buttons of FIG. 25, appearing on the panel 55 of FIG. 1. He then depresses the indicated button, and additional messages appear, such as represented in FIG. 24 which shows instructions to follow in successive steps. Such messages are shown in FIG. 24 as examples of various messages that are and may be utilized and those shown do not necessarily indicate that they must be followed in succession. In the example shown in FIG. 24, the messages are indicated at 192 and upon successive steps, other messages are displayed, such as 192c to push the button corresponding to the cubicle of the selection desired. Following that step, the releasing and ejecting steps are performed, by the component of FIGS. 7–11. Other examples are to return a film, as indicated in instructions 192b of FIG. 24, and then upon actuating the appropriate button, additional instructions are presented as at 192d, to return the film to the cubicle. Another example of a step to be taken, is to change the patron's own identification code, i.e., in the code elements 170b. In this case instructions at 192e on the screen instruct him to push a button #3 of the buttons 56 of FIG. 25. Following the latter step, the screen presents further instructions as indicated at 192f, that the patron should push the code buttons in the order of the code desired. As a result of this last step, the information is placed in the code elements 170b (FIG. 12) and entered into the record, i.e., identification of that patron is complete only by all of the elements 170a and 170b and this latter step erases the information according to his previous code and cancels the effect of the message 192f. It will be understood that the number and character of the messages to be presented are virtually unlimited.

In vending articles, such as TV films, the money deposited is intended to constitute rental for the vended article, and this rental accommodated is necessarily less than the value of the article itself.

In order to take care of the event that the article is not returned, a security deposit is provided for. Such a situation is indicated diagrammatically in FIG. 26 where the numeral 194 diagrammatically represents information on the screen, representing a segment of the record or memory in the computer unit. In the case of TV films, a value of $50, for example, may be assessed as the value of each article, and a security deposit established on that basis. This security deposit is arranged between the patron and the owner of the operation, and the owner, when he issues the ID card, enters the identification thereon in the code elements 170, and also enters the information as to the amount of the security deposit for the patron. In the example given in FIG. 26, one patron is indicated as having a deposit of $200 and another of $300. In the case of a value of $50 for a TV film, the first patron is enabled to withdraw four films, and the second one six films. In the case of the first patron, if he withdraws one film, for example, the record will indicate his effective deposit as being reduced to $150, while if he withdraws four films it will indicate that the deposit credit is depleted. This condition is shown in FIG. 27 at 196. A similar situation exists in connection with the second named patron who can withdraw a maximum of six films at one time.

As the patron returns the films, the record shows the re-establishment of the deposit corresponding to $50 for each film returned.

Another example of activity accommodated is that the patron wishes to make additional security deposit. The indication referring to that step is indicated at 192g (FIG. 24) and to make that step he follows the instruction at 192h, i.e., to push a certain button, one of the buttons 56 (FIG. 25), and in response thereto the screen presents the message at 192i, namely, to deposit money. As the money is deposited, the indication of the value of the security deposit (FIG. 26) is increased according to the value of the tokens deposited.

While the computer unit screen visually shows the information and instructions, it may, if desired be given orally as by means of a speaker 198 of FIG. 28.

FIG. 29 shows the utilization of the ID card for activating the apparatus. The ID card 51 is shown in the slot 52 (FIG. 1) and for this purpose it includes an additional sensing control element 204 on, or embedded in, the ID card (see also FIG. 13) and the sensor element 206, in response to the element 204, activates the control system of the apparatus.

The invention also incorporates a feature whereby articles may be vended on a rental basis, without the use of money inserted. As an example, a security deposit may be required, and in addition to that feature, a rental charge for an article to run for a certain period of time, this rental charge to be in addition to the amount of the security deposit. A patron may obtain the vending of an article according to the foregoing steps and on a rental basis. He finds the message 192k on the screen, indicating to push a certain button, which is on the panel 55 of FIG. 25. He then pushes that button, e.g., #5, and then the message 192l appears, and the patron indicates the number of days the article is to be rented, by pushing the corresponding buttons, this information being entered in the record. Later when the patron again approaches the apparatus and investigates the situation of the rental, he finds the message 192k and finds the additional message concerning the status of the rental. He then pushes the corresponding button, and the message 192m comes up, indicating the number of days remaining of the credit in the security deposit. In the case indicated, it states that two days remain and this step in the operation is indicated diagrammatically in FIG. 30 where the clockwork 208 has a dial 210 including a pointer 212 which, upon rotation of the dial, when it reaches a cooperating marker 214, the security deposit is depleted. This clockwork of FIG. 30 controls the content of the message 192m.

Additionally, it is contemplated that instead of either monetary coins or tokens, paper money may be utilized as represented in FIG. 31, where a money bill 216 is inserted in a slot 218 in the apparatus. The paper money 216 is sensed by a known means, and the subsequent steps in the operation are thereupon completed.

As used herein, the various items, monetary coins, paper money, and tokens, are generically referred to as value pieces.

It is further contemplated that the vending apparatus instead of operating by means of value pieces, may operate merely on the entering of the patron's identification number, and a billing operation, billing the patron for the corresponding charges. Such an arrangement is made between the patron and the owner of the operation originally, and in accordance therewith a bill may be issued for each transaction. This is represented in FIG. 32 where a bill or invoice 220 is issued from a slot 222, directly to the patron at the apparatus. The patron can then accept the bill there, or the owner of the operation may mail the bill to the patron, or both.

Additionally, it is contemplated to issue receipts for money deposited, as indicated at 223, in FIG. 1.

The apparatus may include a printer 224, as in FIG. 33, for printing bills 225 from a roll of paper 226, in the billing operation, or receipts 227 from a roll of paper 228, issued in response to depositing value pieces. A printed record of the transactions is made, either at the substation or at the central station (see below) which can be filed away periodically, for a permanent record. It may be provided to the patron as well as the owner.

It is furthermore contemplated, within the scope of the invention, to utilize a central station and a plurality of substations or locations or local installations controlled by the central station. FIG. 34 diagrammatically represents such an arrangement which includes such a central station 229 and a plurality of substations or local installations 230. Each substation includes a vending unit 40, or equivalent, including the screen of the computer unit. The setting up of the computer control is made in the central station and the servicing of this station replaces the servicing of the local stations from the standpoint of entering information thereinto by the owner for each individual patron; however, in each individual substation the screen shows the instructions for the steps to be taken by the patron in actuating or operating the apparatus.

In such an arrangement as in FIG. 34, monetary pieces or tokens may be used in the same manner as described above, and the billing operation, when that is used, may be arranged at each local station. However, it is also contemplated that a single billing operation would be performed at the central station, that is, every charge that is accrued by the manipulation of the apparatus at the local stations is transmitted to the central station, and bills are made up periodically by the central station and steps are then taken to transmit the bills to the patrons.

While the apparatus described above includes a separate computer unit 57, it is contemplated that the invention be of such scope as to include the utilization of what is known as a "smart card" which is a computer card having a complete computer built therein. Such a card is small, being capable of fitting in an ordinary purse or wallet. This card 231 (FIG. 35) is shown in association with a slot 232 in the apparatus. When the computer card 231 is inserted in the slot, it performs all of the functions referred to above in connection with the computer unit 57. This computer card 231 is programmed in a known mamner and serves as an ID card for a patron.

Attention is directed next to FIGS. 37-42 showing another form of apparatus embodying the features of the invention. The apparatus of these figures includes a vending unit 240, corresponding to the cabinet compartment 43 of FIG. 1, the computer unit and other components being located elsewhere. The vending unit for convenience is identified as having a front side 242, a rear side 244, a right end 246 and a left end 248. It includes a magazine 250 provided with a plurality of cubicles 252 corresponding with the cubicles 59, for receiving the films to be vended. Each cubicle 252 has an upturned stop element 253 (FIG. 41) at the bottom on the rear side, to prevent the film from being moved out through the rear side of the cubicle, in returning the film to the cubicle.

The unit 240 is enclosed in an enclosure or housing 254, which may be transparent if desired, and has an access window or opening 258 through which the films are passed, in vending and returning, the window 258 being at any desired height for convenience in reaching it by the patron. This window is preferably located at the right end of the housing, beyond the unit 240.

The unit 240 may be mounted on suitable upright supports 260 which also are utilized for supporting and guiding the movable components that are active in the vending and receiving steps in the operation. The unit 240 includes a movable component 262 which is active in directly vending the articles and receiving them in return. The component 262 includes horizontal bars 264 and 266, respectively at the front and rear sides, both similar to the bar of the first form, and extending throughout the full length of the magazine 250 and therebeyond at both ends, the bars being, of course, entirely enclosed in the enclosure 254 indicated in FIGS. 38 and 39.

The bars 264, 266 are interconnected by suitable means indicated at 272, 274 as a unit, and movable vertically together. Suitable means is provided for so moving the bars, and thus the whole component 262 vertically, as indicated diagrammatically in FIGS. 38–40, which may include an endless belt 276 trained on an upper pulley 278 and allower pulley 280, one of which is driven, and one of the runs of the belt 278 being connected at 284 to the component 262. One such belt 276 is provided at each end, and the upper pulleys are mounted on a common shaft 282 (FIG. 38).

Mounted on the bar 266 on the rear, is an ejector unit 286 which includes a block 288 riding on the bar 266 and having a shaft or pin 290 extending downwardly through a slot 292 (FIG. 40) that extends nearly the full length of the bar. The ejector unit 286 has an ejecting rod 294 similar to the ejecting rod 110 of the first form, slidably mounted in the block 288 and at its forward end having a block 296 with contacts 298 thereon. The ejecting rod is worked by a driving element 295.

A component 300 is mounted on the front bar 264 and includes a receptacle 302 and an ejector unit 304, this component being slidable along the bar, having a pin 305 extending downwardly through a slot 306 which extends nearly the full length of the bar (FIG. 40). The receptacle 302 is of U-shape for receiving the film 47. The components 286 and 300 are mounted on the respective bars in front-to-rear relation so as to be aligned with any of the cubicles or cells 252 selected, and they are driven in unison along the bars so as to maintain that alignment. The components are driven by suitable means, such as endless belts 308 and 310, each mounted on a set of pulleys 312, 314, respectively, one of each set being driven. One run of each belt 308, 310 is connected to the respective pins 290, 305, at 316, 318. The two belts 308, 310 are driven by a common driving means 319 (FIG. 39) so as to maintain the desired and exact simultaneous movement of the components 286, 300.

In response to the initial steps for performing the vending operation, as described above in connection with the first form of the apparatus, the component 262 moves vertically to the corresponding horizontal rows of cubicles 252, and the units 286, 300 move horizontally along the bars, to the cubicle in the corresponding row, containing the selected film. Then according to the information introduced into the computer unit, by the selection made by the patron, the ejecting rod 294 is driven forwardly (FIG. 41 and the block 296 engages the film 47 which is in the selected cubicle, with the contacts on the block engaging the contactor element 47c on the film, constituting another step in the vending operation. Continued movement of the ejecting rod 294 forces the film 47 out of the cubicle into the U-shaped receptacle 302. As continuing steps in the vending operation, all made pursuant to the selection of the particular film, the unit 262 moves to the level of the access window 258, if it is not already at that level, and the components 286, 300 move to the right end, placing the selected film 47 in alignment with the window, and the patron can then reach in and withdraw it.

The ejector unit 304 in the component 300 is similar to the ejector unit 282, and functions to return the film from the receptacle 306 into the cubicle.

In the process of returning the film to the vending unit, the patron inserts it through the window 258 and places it in the receptacle 302. The computer unit in response to the patron's initial actuation, in the step of returning the film, presents instructions on the screen for taking those steps necessary for effecting the return of the film to the cubicle. For example, the screen presents a question "What is desired?" and the patron then actuates the pushbutton that represents returning the film. Instructions are then given to the patron to insert the film as stated, in the receptacle 306, and then gives further information identifying the film and an indication that it is to be returned. The units 286, 300, acting together as a single component, as stated above, then move to the location of the cubicle in which the film is to be returned, and then the ejector sub-unit 320 moves the film from the receptacle into the cubicle.

Following that step, other steps may be taken, such as having the receptacle returned to the access window 258 and remain there for a future operating step, or it may remain in the position of the cubicle just referred to, for other steps to be taken, depending on the desire of the overall sequence of operation.

Value pieces, of all the kinds mentioned, may be utilized in making payment for any of various items, not only vending of a particular item, but in making up the security deposit, and in paying a past unpaid account.

Included in the operation is the feature that payments may be made by the patron independently of withdrawing or returning articles, for example, reestablishing the security deposit, paying a bill that was previously rendered on credit, etc., and the apparatus keeps a record of all such steps.

Another feature of the apparatus is that each article is individually identifiable, and the same article that is vended is returned for re-vending.

It will be understood that the articles, in this case the films, consist of a large number of distinct, different and identifiable items, although a plurality of each item, such as picture title, song title, etc., may be included.

The invention includes a fail safe feature. Because of the permanent character of the bubble memory and the two-disk arrangement, the information in the computer unit is periodically impressed therein from the current memory of the computer unit, so that if the power to the computer unit should fail, the information in the permanent memory will be preserved.

The individual record of the running activities of each patron serves as a convenient feature in the case where an imperfect article is returned. For example, if a damaged film, or an empty case, etc., should be returned, that fact can be traced to a particular patron, the present patron, or a preceding person.

It is also within the scope of the invention to place sensing elements directly on the films, if desired for performing control operations, as indicated in FIG. 36, where such a sensing element 234 on the film is sensed by a sensor 236 in the apparatus.

We claim:

1. Vending apparatus comprising,
a vending unit containing articles to be vended, the articles having predetermined individual values,
means for receiving ID information from a patron,
record means,
means responsive to entering the ID information, and to manipulation by the patron, for vending an article and recording such vending on the record means,
means responsive to return of the article vended for recording such return on the record means,
a computer unit having means for receiving control information and putting out instructional information and control signals,
means for entering information in the computer unit representing a predetermined security deposit value corresponding to a predetermined number of aritcles, and
means controlled by the computer unit for enabling vending to each patron of only articles having a total value within said security deposit value.

2. Vending apparatus according to claim 1 wherein, the computer unit includes means for presenting information to the patron of the status of his security deposit as related to articles vended against his deposit.

3. Vending apparatus according to claim 2 wherein, the computer unit is operable for presenting the information of the status of the deposit in response individually to each article vended, and each article returned.

4. Vending apparatus comprising
a vending unit containing articles to be vended,
means for receiving ID information from a patron,
record means,
means responsive to entering the ID information, and to manipulation by the patron, for vending an article and recording such vending on the record means,
means responsive to return of the article vended for recording such return on the record means,
a computer unit having means for receiving control information and putting out instructions and control signals,
means responsive to manipulation by the patron for presenting instructions for subsequent steps in vending operations,
means for indicating status of security deposit,
the instructions including such instructions for the patron to indicate the subsequent step in the vending operation,
the computer unit including selecting elements relating individually to subsequent steps, one of which is selecting information as to status of the security deposit, means responisve to insertion of value pieces for energizing the apparatus and enabling operation of the other means mentioned, and
means for receiving additional value pieces and indicating such receipt in the status of the security deposit.

5. Vending apparatus comprising,
a vending unit containing articles to be vended,
means for receiving ID information from a patron,
record means,
means responsive to entering the ID information, and to manipulation by the patron, for vending an article and recording such vending on the record means,
means responsive to return of the article vended for recording such return on the record means, and
the apparatus including means forming identifying elements for establishing ID code numbers for patrons, and being capable of being energized in response to entering information representing each code number, and in response to entering that information being operable for actuation of the apparatus.

6. Vending apparatus according to claim 5 wherein, the apparatus includes means having parts responsive to respective ones of said identifying elements, and
manually actuated means for selectively energizing said indentifying elements for controlling the corresponding parts and thereby establishing said ID code number, said manually actuated means being inaccessible to the patron.

7. Vending apparatus according to claim 6 wherein,
said identifying elements constitute a first group,
each ID code number also includes a second group of identifying elements,
the apparatus includes a second group of parts responsive to respective ones of said second group of identifying elements, and
second manually actuated means for selectively energizing said identifying elements of the second group, and thereby establishing a second identifying code, said second manually actuated means being accessible to the patron.

8. Vending apparatus according to claim 5 in conjunction with,
a plurality of ID cards, and
wherein each ID card includes a complete built-in computer operable for effecting the functions stated.

9. Vending apparatus comprising,
a vending unit containing articles to be vended, the articles being individually distinct and the vending unit having a space corresponding to each article,
means for receiving ID information from a patron,
record means for keeping a record for each individual patron, including a rental account and a security account,
means responsive to entering ID information, and to manipulation by the patron, for vending an article and recording such vending in the rental account in the record means,
means responsive to return of the article vended for recorded such return in the rental account in the record means, the vending and returning means being operable for vending a predetermined selected article and returning the same article to its corresponding said space for re-vending, means for receiving value pieces and for recording them in the security account, and so recording them independently of the vending or returning of articles, whereby to enable a patron to maintain an account independently of the vending or returning of articles.

10. A plurality of vending units each including apparatus according to claim 9 and including,
a central station common to said plurality of units and having operable connection therewith,
said record means being in said central station, and
means operable in response to the performance of an operation in any of the units for making an entry in the record means in the central station.

11. Vending apparatus according to claim 10 wherein,
the central station includes means for producing bills bearing information entered into the records, each bill being individual to an ID code number.

12. Vending apparatus comprising,
a vending unit containing individually indentified articles to be vended,
record means,
means for receiving ID information of individual patrons and entering it in the record means,
means for entering a credit for individual patrons in the record means,
means responsive to actuation by a patron for vending a selected article, independently of the insertion of any value pieces thereinto, and
means for entering in the record means, against the credit account of the respective patron, the charge for the article vended.

13. Vending apparatus according to claim 12 and including,
means for issuing a bill, in response to such actuation by the patron, bearing information, including money changes made, corresponding to such vending.

14. Vending apparatus comprising,
a vending unit containing articles to be vended, and having cubicles, each for accomodating an individual articles, means for confining each article in the cubicle,
means for receiving ID information from parton,
record means,
means responsive to entering the ID information, and to manipulation by the patron, for vending an article and recording such vending on the record means,
a computer unit having means for receiving control information and putting out instructions and control signals,
means responsive to manipulation by the patron for presenting instructions for subsequent steps in vending operations, the instructions including such instructions as to selection of predetermined articles,
the computer unit including selecting elements relating individually to the articles, and effective upon manipulation thereof for vending corresponding articles, and
the selecting elements being operable for releasing the articles for enabling the patron to grasp then and withdraw them.

15. Vending appartus according to claim 14 wherein,
the vending unit includes a cabinet and a housing enclosing it,
the housing having an access window,
the cabinet having cubicles holding the articles in unlocked condition, and
the vending unit including means responsive to actuation by the patron for removing selected articles from the cubicles and carrying them to the access window for withdrawal by the patron.

16. Vending apparatus according to claim 15 wherein,
the cubicles are inaccessible to a patron reaching through the access window.

17. Vending apparatus according to claim 15 wherein,
the vending unit incorporates a vending component including an ejector unit and a receiver unit respectively on opposite sides of the cabinet and together movable to positions in alignment with any of the cubicles containing the articles, and
the actuation means is operable in response to a selecting actuation by the patron, for moving the vending component to alignment with a predetermined cubicle for actuating the ejector unit for ejecting the selected article from the cubicle unto the receiver unit, and then moving the vending unit to position in which the receiving unit is in register with the access window.

18. Vending apparatus according to claim 15 wherein,
the vending unit incorporates a vending component including an ejector unit and a receiver unit, respectively on opposite sides of the cabinet and together movable to a position in alignment with the cubicle containing the selected article, and
the actuation means is operable, in response to actuation by the patron, for receiving an article in return by the patron into the receiver unit, and then moving the vending component to said position in alignment with a respective cubicle and moving the article into the cubicle.

19. Vending apparatus according to claim 14 wherein,
the articles, when confined, are exposed to view by the patron, and the releasing means includes means movable to a position registering with each article and when in such position operable for releasing the respective article.

20. Apparatus according to claim 14 and including,
means on each article operable, when the article is in its cubicle, for controlling the securing and releasing means.

21. A method of vending reusable articles to a patron in the absence of immediate attention by a vendor, comprising,
providing a container holding the articles,
vending an articles to a patron in response to his selection and manipulation,
later accepting the same article into the container from the patron,
establishing a record of the patrons identity, and including a security account, and
making an entry in the patron's security account of articles vended, automatically in response to the vending of the aritcles, and later making an entry in the patron's security account of articles accepted, automatically in response to the acceptance of the articles.

22. A method according to claim 21 and including the step, accepting payment by the patron, independently of vending and making an entry thereof in the security account automatically in response to said payment by the patron, whereby to enable the patron to increase his security account against which later vending steps can be entered.

23. Vending apparatus comprising, a stationary magazine including a plurality of cubicles having individual identification, the magazine being adapted to receiving in the cubicles thereof articles to be vended, in position wherein they are all observable and identifiable by a patron in a single position, a common receptacle for receiving articles from any and all of the cubicles accessible to the patron, means for receiving informational data from a patron, and article handling means responsive to entering data by a patron, identifying a patricular cubicle, operable for withdrawing the article from the identified cubicle and placing it in the receptacle, said article handling means being responsive solely to said data entered by the patron to the exclusion of any control relationship with the magazine.

24. Apparatus according to claim 23 wherein, the cubicles are arranged side-by-side and have open ends lying in a common surface having X and Y axes, and the article handling means includes a single carriage unit movable in said surface through both X and Y directions, for operable engaging any of the articles in the cubicles.

25. Apparatus according to claim 24 wherein, the magazine is rectangular in shape and has great dimension in each X and Y direction, whereby to provide a great number of cubicles and articles therein, and said surface lies in a plane, whereby to provide maximum number of cubicles in a given size enclosure such as a cabinet.

26. Vending apparatus comprising, a magazine including a plurality of cubicles having individual identification, the magazine being adapted to positioning in the cubicles thereof of articles to be vended, a common receptacle for receiving articles from any and all of the cubicles, accessible to a patron, means for reciving informational data from a patron, and atricle handling means responsive to entering data by a patron identifying a patricular cubicle, and following the conclusion of entering such data in an initial step and in the absence of entering additional data, operable for withdrawing the articles from the identified cubicle and placing it in the receptacle, the article handling means being operable also, responsive to entering data by a patron, for picking up an article from the receptacle and returning it to the previously identified cubicle.

27. Vending apparatus according to claim 26 wherein, said article handling means is so operable independently of retention of any physical article utilized for so entering said data.

* * * * *